United States Patent [19]
Krausz et al.

[11] 3,876,800

[45] Apr. 8, 1975

[54] PHARMACEUTICAL COMPOSITIONS AND METHODS FOR TREATING INFLAMMATION AND PAIN

[75] Inventors: Francois Krausz; Marcel Daniel Pierre Brunaud, both of Herault, France

[73] Assignee: Clin Midy, Paris, France

[22] Filed: Dec. 7, 1973

[21] Appl. No.: 423,378

Related U.S. Application Data
[63] Continuation-in-part of Ser. No. 35,919, May 8, 1970, abandoned.

[30] Foreign Application Priority Data
May 12, 1969 France .............................. 69.15296

[52] U.S. Cl............................. 424/317; 260/515 A
[51] Int. Cl............................................ A61u 27/00
[58] Field of Search................. 424/317; 260/515 A

[56] References Cited
UNITED STATES PATENTS

| | | | |
|---|---|---|---|
| 3,385,886 | 5/1968 | Nicholson et al. | 260/515 |
| 3,457,300 | 7/1969 | Dorn et al. | 260/515 |
| 3,754,021 | 8/1973 | Shen et al. | 260/515 A |

OTHER PUBLICATIONS

Caputo et al., Chem. Abst., Vol. 68, pp. 1272–1273, (1968).

*Primary Examiner*—Stanley J. Friedman
*Attorney, Agent, or Firm*—Stevens, Davis, Miller & Mosher

[57] ABSTRACT

Pharmaceutical compositions containing a 4-phenylbutyric acid derivative in association with a compatible pharmaceutical carrier.

7 Claims, No Drawings

PHARMACEUTICAL COMPOSITIONS AND METHODS FOR TREATING INFLAMMATION AND PAIN

This application is a continuation-in-part of our application Ser. No. 35,919 filed on May 8, 1970 now abandoned under the title: "4-Phenylbutyric acids and their derivatives."

This invention relates to 4-(disubstituted phenyl) butyric acids and certain functional derivatives thereof and to the preparation thereof. These compounds have been found to possess valuable pharmacological properties.

It is an object of the invention to provide new analgesic and antiinflammatory materials which can be used in human and veterinary medicine.

According to the present invention there is provided a 4-phenylbutyric acid or a functional derivative thereof having the general formula

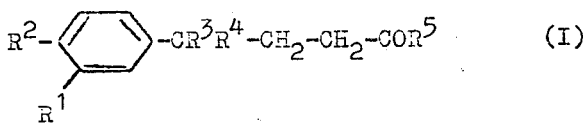
(I)

in which $R^1$ is a chlorine atom or a nitro group, $R^2$ is an iso-propyl, tertiary-butyl or cyclohexyl group, each of $R^3$ and $R^4$ is a hydrogen atom or one is a hydrogen atom and the other an hydroxyl group or the two together represent an oxygen atom and $R^5$ is an hydroxyl group, an -O-Alkyl group or an -O-Metal group in which Metal represents an equivalent of a metal, or is a group having the formula

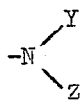

in which Y represents a hydrogen atom or a lower alkyl group and Z is a hydrogen atom, a lower alkyl or a tertiary aminoalkyl group or Y and Z taken together with the nitrogen atom to which they are attached form a heterocyclic group having at least five but not more than seven nuclear atoms, and when $R^5$ is a basic group, salts thereof with acids.

To prepare those of the compounds having the general formula I in which $R^1$ is a chlorine atom, the procedure according to the invention is as follows: A 4-phenyl-4-ketobutyric acid having the general formula:

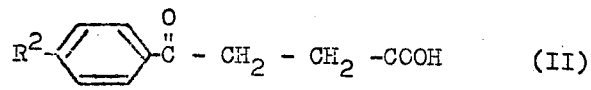
(II)

is reacted with a sufficient quantity of anhydrous aluminum chloride to form an acid complex in which the carbonyl group is blocked; this complex is then subjected to chlorination, preferably in methylene chloride, and the complex is then decomposed using hydrochloric acid at low temperature. The resulting 3-chlorophenyl keto acid may then be subjected to a reduction, preferably by the method of Wolf-Kishner or by that of Clemmensen to give acids in which both $R^3$ and $R^4$ are hydrogen atoms. To prepare compounds in which one of the symbols $R^3$ and $R^4$ is an hydroxyl group, reduction is carried out by means of a complex hydride such as sodium borohydride in order that the reduction may be more easily controlled. The hydroxy acid obtained is usually partly produced in the form of the corresponding lactone.

To prepare those of the compounds having the general formula I in which $R^1$ is a nitro group acids having the general formula II above are mono-nitrated. This may be carried out by dissolving an acid having the general formula II in concentrated sulphuric acid and adding a nitrating agent thereto the amount of nitrating agent being substantially that required to introduce one nitro group. Fuming nitric acid may be used as the nitrating agent.

To esterify the acids they are conveniently dissolved in an alkanol containing a hydrogen halide, e.g., hydrogen chloride. Esterification readily takes place at room temperature of standing and the ester corresponding to the alkanol used can then be isolated from the reaction mixture.

To prepare the amides and N-substituted amides of the acids the latter are first converted to a corresponding acid halide e.g. by treatment with thionyl chloride and the acid halide then treated with ammonia or with a primary or secondary lower alkylamine which may contain a tertiary amino group e.g. 3-morpholinyl-n-propylamine. Alternatively a heterocyclic secondary amine may be used having five to seven atoms in the heterocycle including a secondary amino nitrogen atom, e.g. morpholine or the N-alkylpiperazines.

The alkali metal salts of the acids may be prepared by neutralising a solution of any of the acids with a solution of an alkali metal hydroxide e.g. caustic soda or caustic potash and isolated by evaporating the resulting reaction mixture to dryness. The alkaline earth metal salts may be prepared from solutions of the alkali metal salts produced as outlined above by the addition of a solution of a soluble salt of the desired alkaline earth metal e.g. calcium chloride in the case of calcium. The latter salts are, in general, insoluble and separate from the solutions.

The acids having the general formula II may be prepared by known methods, in particular by the reaction of succinic anhydride with cumene, tertiary butylbenzene or cyclohexylbenzene in the presence of aluminum chloride.

The following examples illustrate the preparation of the compounds of the invention.

EXAMPLE 1 a. 4-(3'-Chloro-4'-isopropylphenyl)-4-Ketobutyric acid (844 CB)

55 g of 4-(4'-isopropylphenyl)-4-keto-butyric acid dissolved in 150 ml of methylene chloride are poured on to 80 g of anhydrous aluminium chloride. Vigorous evolution of hydrochloride acid gas is observed during the addition. 15 ml of liquid chlorine (previously liquefied in a bath of carbon dioxide snow) are then bubbled into the reaction mixture during 7.5 hours. The reaction mixture is left to stand overnight and then poured on to 800 g of ice which has been acidified with concentrated hydrochloric acid, the reaction mixture is decanted, and the organic phase is washed until the pH is 6.5. The solvents are evaporated off and the solid material is dissolved in 20 volumes of acetonitrle from which it is recrystallised. 44 g (yield 69%) of chlorinated acid are obtained. M.p. = 117° to 118°. Cl: Found 14%, calculated 13.95%.

b. Sodium and calcium salts 20 g (0.079 mol) of 4-(3'-chloro-4'-isopropylphenyl)-4-keto-butyric acid in 300 ml of distilled water are exactly neutralised with normal sodium hydroxide in the presence of phenolphthalein.

The solution of the sodium salt is treated with charcoal, filtered and divided into two equal parts.

A. The sodium salt is isolated from one part after first evaporating off the water and taking up the residue in hexane, freeing it from liquid and drying it. 11 g of this salt are obtained.

Na: Found 8.33%, calculated 8.32%.

B. To the second part 25 ml of an aqueous solution of calcium chloride (7.9 g/l) are added dropwise.

The precipitated calcium salt is freed from liquid, washed several times with water and dried to constant weight. 8 g of the salt are obtained. Ca: Found 7.14%, calculated 7.31%.

EXAMPLE 2 n-Butyl 4-(3'-chloro-4'-isopropylphenyl)-4-keto-butyrate (845 CB)

9 g of 4-(3'-chloro-4'-isopropylphenyl)-4-keto-butyric acid in 60 ml of n-butanol saturated with hydrochloric acid are left to stand for 48 hours. The excess of butanol is evaporated off and the ester is distilled. 8 g of the ester are obtained (Yield 73%). B.p. = 151°–153°C/0.5 mm. Cl%: Found 11.64, calculated 11.43.

EXAMPLE 3

4-(3'-Nitro-4'-isopropylphenyl)-4-keto-butyric acid (849 CB)

41 g of 4-(4'-isopropylphenyl)-4-keto-butyric acid are added at −5°C to 300 ml of concentrated sulphuric acid in the course of 15 minutes.

The reaction mixture is then cooled to −10°C, and 41 ml of fuming nitric acid are added over one hour. After this addition and supplementary stirring (1 hour), the reaction mixture is poured on to 1.500 kg of ice and then extracted with diethylether, the ethereal phase separated and washed with water until neutral. The ethereal phase is then dried, the ether evaporated off, and the residue dissolved in 100 ml of hot acetonitrile. The solution is then cooled and 23.5 g of acid are obtained (Yield 45%), m.p. = 140°C.

EXAMPLE 4 a. 4-(3'-Chloro-4'-tertiary-butylphenyl)-4-keto-butyric acid (802 CB)

310 g of anhydrous aluminium chloride, 234 g of 4-(4'-tertiary-butylphenyl)-4-keto-butyric acid and 600 ml of methylene chloride are introduced into a 2-litre three-necked flask.

60 ml of liquefied chlorine are introduced slowly, drop by drop, into the solution of the stirred complex in the course of 5 hours. Stirring is continued overnight at 25°C.

The reaction mixture is poured on to 2 kg of ice, the organic phase extracted twice, each time with 200 ml of methylene chloride, washed 5 times, each time with 500 ml of water and then dried and the methylene chloride is evaporated. The product obtained is recrystallised from toluene. 183 g (yield 68%) of acid are obtained. M.p. 119° to 120°C.

b. Sodium salt

A suspension of 8 g (0.0298 mol) of 4-(3'-chloro-4'-tertiary-butylphenyl)-4-keto-butyric acid in 100 ml of distilled water is exactly neutralised with normal sodium hydroxide in the presence of phenolphthalein. The sodium salt formed immediately dissolves. The solution obtained is treated with charcoal, the water distilled and the substance remaining is taken up in ethanol which is then distilled to eliminate all traces of water. The salt obtained is stirred in suspension in hexane for 2 hours, free from liquid and dried. 6.5 g of the sodium salt are obtained.

EXAMPLE 5 n-Butyl-4-(3'-chloro-4'-tertiary-butylphenyl)-4-keto-butyrate (841 CB)

0.05 Mol (13.4 g) of 4-(3'-chloro-4'-tertiary-butylphenyl)-4-keto-butyric acid is suspended in 60 ml of n-butanol saturated with gaseous hydrogen chloride. After having been left to stand for one day, the reaction mixture is completely homogeneous. The ester is distilled off after 48 hours of contact. B.p. = 155° to 158°C/0.2 mm. Cl%: Found: 10.8, calculated 10.9.

EXAMPLE 6

4-(3'-Nitro-4'-tertiary-butylphenyl)-4-keto-butyric acid (851 CB)

300 ml of concentrated sulphuric acid are introduced into a 1000 ml flask. The flask and contents are cooled to 0°C and 46.8 g (0.2 mol) of 4-(4'-tertiary butylphenyl)-4-keto-butyric acid are added with stirring. The solution becomes black. It is cooled to −10°C and 42 ml of fuming nitric acid are added in the course of 30 minutes at this temperature. The reaction is highly exothermic. The reaction mixture is stirred for 45 minutes at −10°C. The solution becomes clear. It is poured on to 2 kg of ice, and the white precipitate is extracted 3 times, each time with 500 ml of methylene chloride. The organic phase is washed with water until neutral, dried and evaporated to dryness. The product obtained is recrystallised from 320 ml of hot toluene. It is dissolved in the toluene and left to cool to 30°C and petroleum ether is added at this temperature until the solution becomes cloudy. It is then cooled more vigorously (to 0°C) and the product is left to crystallise. The crystals obtained are freed from liquid and dried. 36 g (yield 64%) of the acid are obtained. M.p. = 134°C.

EXAMPLE 7 a. 4-(3'-Chloro-4'-cyclohexylphenyl)-4-keto-butyric acid (804 CB)

177 g of anhydrous aluminium chloride are introduced into a three-necked 1-litre flask. A hot solution of 144 g of 4-(4'-cyclohexylphenyl)-4-keto-butyric acid in 330 ml of methylene chloride is added slowly from a dropping funnel. Slight reflux is observed during this addition. 33.2 ml of liquefied chlorine are then introduced slowly, drop by drop. This addition requires 5 hours. The solution is then poured on to 1 kg of ice containing 100 ml of concentrated hydrochloric acid. The aqueous phase is extracted twice, each time with 200 ml of methylene chloride, the organic phase is washed with water to pH 6.5 and dried and the organic solvent then evaporated. The acid is recrystallised from 500 ml of toluene. The yield is 64%. M.p.: 159°C.

b. Sodium salt 10 g of acid contained in a mixture of 70 ml of water and 30 ml of ethanol are exactly neutralised with normal sodium hydroxide in the presence of phenolphthalein. The solution is then passed through decolorising carbon, and the decolorised solution freed from solvents. 150 ml of ethanol are then added and the solution is concentrated to drive off the residual water. The crystallised sodium salt is taken up in 200 ml of hexane, stirred for 2 hours, and freed from liquid. It is then dried in vacuo. 8 g of this salt are obtained.

c. Calcium salt.

10 g of acid in a mixture of ethanol and water (30:70) are neutralised with normal sodium hydroxide in the presence of phenolphthalein. 23 ml of a solution of calcium chloride (49.5 g/l) are introduced, drop by drop, into the resulting solution of the sodium salt whilst stirring. The calcium salt precipitates and is slurried in water: several washings are carried out. The salt is dried under reduced pressure. 10 g of the calcium salt are obtained.

EXAMPLE 8 n-Butyl 4-(3'-chloro-4'-cyclohexylphenyl)-4-keto-butyrate (832 CB)

13.7 g (0.07 mol) of 4-(3'-chloro-4'-cyclohexylphenyl)-4-keto-butyric acid are added to 70 ml of n-butanol saturated with hydrochloric acid gas. The reactants are left in contact for 22 hours, the reaction mixture being stirred from time to time. The mixture becomes homogeneous after 8 hours. The solvent is evaporated off and the ester obtained is distilled. B.p. = 210°–215°C/0.8 mm.

The product is then redistilled at a lower absolute pressure. B.p. = 185°–187°C/0.15 mm. The yield is 12.5 grams (77% of the theoretical yield).

EXAMPLE 9

4-(3'-Nitro-4'-cyclohexylphenyl)-4-keto-butyric acid (850 CB)

24 ml of fuming nitric acid are added in the course of 20 minutes to a solution of 26 g (0.1 mol) of 4-cyclohexylbenzoylpropionic acid in 150 ml of concentrated sulphuric acid at −10°C, the temperature being at the same time maintained at −10°C. The solution is stirred for 30 minutes at −10°C and, without letting it warm up to room temperature, it is poured on to 200 g of ice. The organic phase is extracted twice, each time with 100 ml of methylene chloride, and the combined organic extracts then dried over sodium sulphate. Methylene chloride is evaporated and the product recrystallised from a mixture of 120 ml of toluene and 70 ml of petroleum ether. 25 g (yield 82%) of the acid are obtained. M.p.: 129°C.

EXAMPLE 10

4-(3'-Chloro-4'-tertiary-butylphenyl)-4-hydroxybutyric acid (842 CB)

0.05 mol (13.5 g) of 4-(3'-chloro-4'-tertiary-butylphenyl)-4-ketobutyric acid is dissolved in 100 ml of absolute ethanol, and 5 g of sodium borohydride is added in small portions at 5°C in the course of 0.5 hour. The reaction mixture is then stirred for 2 hours at room temperature, 200 ml of water are added, and the pH is adjusted to 2 with concentrated hydrochloric acid. The reaction product is extracted with diethyl ether and the solvents evaporated after drying under reduced pressure. Heating is continued for 3 hours under reduced pressure at 50°C. 11 g of a mixture of lactone and acid are obtained. The yield of acid is 81%.

EXAMPLE 11

4-(3'-Chloro-4'-cyclohexylphenyl)-4-hydroxybutyric acid (826 CB)

15 g (0.05 mol) of 4-(3'-chloro-4'-cyclohexylphenyl)-4-ketobutyric acid are introduced into 100 ml of anhydrous ethanol. 0.1 mol (5 g) of sodium hydride is added in small portions in the course of 0.5 hour. After this addition is completed, the temperature is allowed to rise to 20°C and the reaction mixture is stirred for 2 hours. The reaction mixture is then poured into 200 ml of water, acidified to pH 2 with concentrated hydrochloric acid, and extracted with diethyl ether. The ethereal extracts are combined, dried and the ether is evaporated. 13 g of partially lactonised hydroxy acid are obtained. The yield of acid is 86%.

EXAMPLE 12

4-(3'-Chloro-4'-isopropylphenyl)-n-butyric acid (848 CB)

100 g of 4-3'-chloro-4'-isopropylphenyl)-4-ketobutyric acid, 75 g of potassium hydroxide, 65 ml of hydrazine hydrate and 535 ml of ethylene glycol are introduced into a stainless steel reactor which is then closed.

The mixture in the reactor is heated at 145°C for 1 hour and at 200°C for 4 hours. It is cooled, 270 ml of water are added, the aqueous phase is extracted three times with 50 ml of benzene and acidified with hydrochloric acid, and the precipitated acid is extracted with benzene. The benzene phase is washed with water until neutral, dried and the acid is distilled.

First distillation: B.p. = 151° to 152°C/0.15 mm

Rectification: B.p. = 148°C/0.13 mm. 68 g (yield 72%) of acid are obtained.

EXAMPLE 13

4-(3'-Chloro-4'-isopropylphenyl)-n-butyramide (857 CB)

A solution of 12 g of 4-(3'-chloro-4'-isopropylphenyl)butyric acid in 50 ml of dry benzene is added at 20°C during the course of 30 minutes to 7 g of thionyl chloride. After refluxing for 2 hours, the benzene and excess of thionyl chloride are evaporated off. The resulting crude acid chloride is taken up in 20 ml of diethyl ether and added to 100 ml of concentrated ammonia at 10°C. The reaciton mixture is stirred for 30 minutes. After neutralisation of the reaction mixture, the precipitate which forms is filtered and washed with water, and the precipitated amide is dried in a stove. It is recrystallised from three times its volume of benzene. 9 g (yield 75%) are obtained. M.p. 116°C.

EXAMPLE 14

4-(3'-Chloro-4'-isopropylphenyl)-butyryl 4''-methylpiperazide hydrochloride (856 CB)

A solution of 12 g of 4-(3'-chloro-4'-isopropylphenyl)-butyric acid in 50 ml of dry benzene is added during the course of 30 minutes at 20°C to 7 g of thionyl chloride. The reaction mixture is heated under reflux for two hours. Excess benzene and reagent are removed under reduced pressure. A solution of 5 g of N-methylpiperazine in 50 ml of dry benzene is then added to the acid chloride over 30 minutes. The precipitated hydrochloride obtained is dissolved in alkaline water, and the free amine is extracted with diethyl ether, and the combined ether extracts washed with water until neutral. From the ethereal solution of the amide, after drying over sodium sulphate, the hydrochloride is precipitated by the addition of a solution of hydrogen chloride in diethyl ether. The hydrochloride is dried under reduced pressure. 13.5 g (yield 79%) of the hydrochloride are obtained. M.p. 144°–147°C

EXAMPLE 15

4-(3'-Chloro-4'-isopropylphenyl)-butyryl morpholide (853 CB)

12 g (0.05 mol) of 4-(3'-chloro-4'-isopropylphenyl)-butyric acid are treated, as described in the previous example with 7 g of thionyl chloride in 50 ml of dry benzene. 8.7 g of morpholine dissolved in 50 ml of dry benzene are added to the resulting acid chloride during the course of one hour. The reaction mixture is refluxed for 2 hours, treated with 200 ml of water, and adjusted to pH 6–7. The benzene phase is separated, washed with water, dried, and freed from solvent The morpholide is distilled. B.p. = 196° to 197°C/0.1 mm. 11.5 g (yield 74%) of morpholide are obtained.

EXAMPLE 16

4-(3''-Chloro-4'-isopropylphenyl)-butyryl-(3''-morpholinyl-n-propylamide) hydrochloride (852 CB)

12 g (0.05 mol) of 4-(meta-chloro-para-isopropylphenyl)-butyric acid are treated as described in Example 14, with 7 g of thionyl chloride in 50 ml of dry benzene. 0.05 mol (7.2 g) of 3-morpholinyl-propylamine is added to the resulting acid chloride in the course of 0.5 hour. The reaction mixture is then heated under reflux for 2 hours. The hydrochloride obtained is isolated and converted into the base in an alkaline medium. The precipitate obtained is dissolved in diethyl ether and the ethereal solution washed until neutral. The hydrochloride is precipitated from the dried ethereal extract by the addition of a solution of anhydrous hydrochloric acid in diethyl ether. The product obtained is freed from liquid and dried. 16 g (yield 79.5%) are obtained. M.p.: 112°C.

EXAMPLE 17 a. 4-(3'-Chloro-4'-tertiary-butylphenyl)-butyric acid (788 CB)

115 g of 4-(3'-chloro-4'-tertiary-butylphenyl)-4-keto-butyric acid, 78 g of caustic potash pellets, 500 cc of diethylene glycol and 46 cc of 85% hydrazine hydrate are introduced into a stainless steel reactor of 1 litre capacity equipped with stirrer, thermometer and water separator.

The reaction mixture is heated to 140°C for 2 hours and then to 195° to 200°C for 2 hours. It is then cooled, diluted with 250 ml of water and extracted twice, each time with 400 ml of toluene. The aqueous phase is then acidified and extracted three times, each time with 300 ml of diethyl ether, the ethereal extracts are combined and dried over sodium sulphate, the ether is evaporated, and the acid is distilled. B.p. = 140°C/0.7 mm. 89 g of product are obtained (yield 81.5%).

b. Sodium and calcium salts 15 g of 4-(3'-chloro-4'-isopropylphenyl)-butyric acid suspended in 200 ml of 50% ethanol are exactly neutralised by the addition of normal sodium hydroxide in the presence of phenolphthalein.

A. 100 ml of the solution obtained are evaporated to dryness, and the residue is taken up twice, each time with 50 ml of ethanol which is evaporated after drying the solution. The solid obtained is suspended in 100 ml of hexane, stirred, strained and dried.

B. The remaining 100 ml are treated with an excess of calcium chloride solution, and the precipitate formed is stirred overnight in the presence of the solution from which it precipitated. The calcium salt obtained is freed from liquid, washed five times, each time with 100 ml of distilled water, and dried.

EXAMPLE 18 n-Butyl 4-(3'-chloro-4'-tertiary-butylphenyl)-butyrate (854 CB)

7.5 g of 4-(3'-chloro-4'-tertiary-butylphenyl)-butyric acid are suspended in 75 ml of n-butanol saturated with hydrochloric acid. The reaction mixture is left to stand for 16 hours at 20°C. The ester is distilled from the homogeneous reaction medium obtained. B.p. = 165°C/0.07 mm. 7 g of ester are obtained (yield 77%).

EXAMPLE 19

4-(3'-Chloro-4'-tertiary-butylphenyl)-butyryl N--methyl-piperazide hydrochloride (808 CB)

a. Acid chloride 37.5 g of pure thionyl chloride are introduced into a three necked flask of 250 ml capacity equipped with stirrer, dropping funnel and condenser, and heated on a water bath to 35°–40°C. 0.25 mol (63.5 g) of the acid obtained in Example 17 dissolved in 50 ml of benzene is then added at this temperature during the course of 30 minutes. The temperature is allowed to rise to 50° to 60°C. The reaction mixture is then stirred for a further 2 hours at 60° to 70°C and the flask is then fitted up for distillation. The first fractions are allowed to distil at atmospheric pressure until the temperature at the head of the column reaches 80°C. The reaction mixture is then decanted and the acid chloride is distilled at low pressure. B.p. = 134°–135°C/0.05 mm. 52 g of product are obtained (yield 76%).

b. N-Methylpiperazide hydrochloride 0.05 mol (5 g) of N-methylpiperazine dissolved in 30 ml of benzene is introduced into a three-necked flask of 50 ml capacity. 0.05 mol (13.6 g) of the acid chloride is then added at 25°–35°C during the course of one hour with stirring. The reaction mixture is heated to 80°C for 1 hour and cooled to 10°C and the hydrochloride formed is drained off and washed with 30 ml of cold benzene. The product obtained is dried and recrystallised from 50 ml of anhydrous benzene. M.p. = 158°–161°C. 9 g of hydrochloride (yield 49%) are obtained.

EXAMPLE 20

4-(3'-Chloro-4'-tertiary-butylphenyl)-butyryl morpholide (792 CB)

A solution of 9 g of morpholine in 15 ml of anhydrous benzene is added during the course of one hour at 0°C to 0.05 mol (13.6 g) of the acid chloride prepared as described in Example 19. Stirring is continued for 4 hours at room temperature, the solution is poured into 100 ml of water, and the benzene phase is washed twice, each time with 100 ml of water. After the benzene has been driven off, the residue is distilled. B.p. = 220°C/2 mm.

|  | Found | Calculated |
|---|---|---|
| Cl% | 10.9 | 10.8 |
| N % | 4.32 | 4.19 |

EXAMPLE 21 a. 4-(3'-Chloro-4'-cyclohexylphenyl)-butyric acid (791 CB)

46 g of 4-(3'-chloro-4'-cyclohexylphenyl)-4-ketobutyric acid, 180 ml of diethylene glycol, 17 ml of hydrazine hydrate and 28.4 mg of caustic potash are introduced into a stainless steel reactor of 500 ml capacity equipped with decantation cooler, stirrer and thermometer. The reaction mixture is heated to 140°C (1 hour) and then to 180° to 190°C for 2 hours. It is cooled, 90 ml of water are added, and the aqueous phase is extracted three times, each time with 200 ml of benzene. The aqueous phase is then acidified to pH 2 and extracted three times, each time with 200 ml of benzene. The benzene phase after washing with water (to pH 6) and drying is concentrated to dryness. The acid is recrystallised from hexane. 36 g (yield 82%) of acid are obtained. M.p. = 67°–68°C.

b. Sodium salt 10.5 g of 4-(3'-chloro-4'-cyclohexylphenyl)-butyric acid are suspended in a mixture of ethanol and water (30:70) and exactly neutralised with normal sodium hydroxide in the presence of phenolphthalein. The solution is passed over charcoal, filtered and freed from solvents. 100 ml of ethanol are added to the residue and then driven off after drying. The sodium salt is then stirred in 200 ml of hexane, drained and dried under reduced pressure. 9 g of the sodium salt are obtained. Sodium %: Found 7.63, calculated 7.60.

c. Calcium salt 20.2 ml of calcium chloride dissolved in water (96.3 g per litre) are added dropwise to a solution of the sodium salt prepared from 10.5 g of 4-(3'-chloro-4'-cyclohexylphenyl)butyric acid suspended in 70 ml of water and 30 ml of ethanol and exactly neutralised with sodium hydroxide in the presence of phenolphthalein. The calcium salt is filtered off, washed several times with water, and dried under reduced pressure. 9 g of this salt are obtained. Ca%: Found 6.59, calculated 6.67.

EXAMPLE 22 n-Butyl 4-(3'-chloro-4'-cyclohexylphenyl)-butyrate (846 CB)

10 g of the acid suspended in 60 ml of butanol saturated with hydrochloric acid are allowed to stand for 40 hours. The butanol is then evaporated and the ester is distilled. B.p. = 171°C/0.2 mm. 11.5 g (yield 96%) of ester are obtained; Cl%: Found 10.47, calculated 10.55.

EXAMPLE 23

4-(3'-chloro-4'-cyclohexylphenyl)-butyramide (801 CB)

a. Acid chloride 210 g of thionyl chloride are introduced into a one litre three-necked flask, and 264 g of acid dissolved in 200 ml of dry benzene are added at 35° to 40°C during the course of 30 minutes. After additional heating under reflux for 2 hours, the excess of benzene and thionyl chloride are evaporated off. The acid chloride is distilled under reduced pressure. 131 g (yield 48%) of the acid chloride are obtained B.p. = 180°–182°C/0.4 mm.

For most purposes, this acid chloride can be used in the crude state without rectification.

b. Amide 50 ml of concentrated ammonia are introduced into a 100 ml three-necked flask, and the pure acid chloride (14·g) is added during the course of 20 minutes at room temperature. The reaction mixture is then heated with stirring at 80°C for 2 hours, cooled to 0°C, the precipitated amide drained off, dried and recrytallised from absolute ethanol. 10 g of amide (yield 77%) are obtained. M.p. = 136°C.

EXAMPLE 24

4-(3'-Chloro-4'-cyclohexylphenyl)-butyryl N-methyl-piperazide hydrochloride (814 CB)

A solution of 0.05 mol (15 g) of acid chloride in 50 ml of dry benzene is added during the course of 1.5 hours to 5 g of N-methylpiperazine dissolved in 50 ml of dry benzene in a 250 ml three necked flask. The temperture has risen to 40°C at the end of the reaction. The reaciton mixture is cooled and the hydrochloride is filtered and dried. It is recrystallised from 30 ml of benzene. 14 g of the N-methylpiperazide hydrochloride (yield 70%) are obtained. M.p.: 160°–165°C.

EXAMPLE 25

4-(3'-Chloro-4'-cyclohexylphenyl)-butyryl morpholide (813 CB)

7 Grams of thionyl chloride are introduced into a 100 ml three-necked flask. A solution of 13 g (0.046 mol) of 4-(3'-chloro-4'-cyclohexylphenyl)-butyric acid in 15 ml of dry benzene is added during the course of 20 minutes, the reaction mixture being simultaneously cooled in order to prevent the temperature rising above 40°C. The reaction mixture is stirred for 30 minutes at 40°C on a water bath. Distillation apparatus is attached to the flask, and the benzene and excess of thionyl chloride are distilled. Distillation is completed under reduced pressure. 8.7 g (0.1 mol) of morpholine dissolved in 10 ml of benzene are then added during the course of 20 minutes: the temperature rises to 50°C during this addition. The reaction mixture is then heated to 50°C for 30 minutes. It is next poured into 400 ml of water and decanted and the benzene phase is extracted three times with 150 ml of water each time to pH 7. The benzene phase is dried over sodium sulphate and the benzene is evaporated off after the substance has been decolorised with charcoal. 17 g of crude product are obtained. A first distillation is carried out and the product obtained is then rectified. 9.5 g (yield 59%) of the morpholide are obtained. B.p. = 240°C/0.4 mm.

EXAMPLE 26

4-(3'-Chloro-4'-cyclohexylphenyl)-butyryl-(3''-morpholinyl-n-propylamide) hydrochloride (807 CB)

14.5 g of 1-amino-3-morpholino-propane in 50 ml of benzene are added in the course of 0.5 hour at 15° to 20°C to 13.75 g (0.046 mol) of the acid chloride prepared as described in Example 23. After this addition, stirring is continued for 1.5 hours at 5°C, and the hydrochloride formed is filtered off and washed with benzene. The benzene phase is washed with water until neutral, dried, and neutralised with a solution of gaseous hydrogen chloride in anhydrous diethyl ether. The amide hydrochloride is drained off, washed with petroleum ether, and dried to constant weight. 16 g (yield 82%) are obtained. M.p.: 114°–117°C (decomposition)

|  | Found | Calculated |
|---|---|---|
| Cl% | 16.0 | 16.0 |
| N % | 3.20 | 3.16 |

The compounds of the invention have been subjected to a pharmacological study. The tests carried out are described below with reference to the two appended Tables which show the results determined for these various compounds.

I ACUTE TOXICITY (COLUMN A OF TABLE I)

The acute toxicity of the products was studied in mice after administration by the intraperitoneal and oral routes.

The animals were divided at random into batches of 10 from a homogeneous population.

1. Toxicity by Intraperitoneal Route

The products dissolved in a suitable solvent are administered intraperitoneally in increasing doses, each dose being tried on a batch of 10 mice. The mortality of the mice is observed during 48 hours.

2. Toxicity by Oral Route

The products in a suitable solvent are administered orally by oesophageal tube. The mortality of the animals is observed during 72 hours.

For the most interesting products, the median lethal dose is calculated by Miller and Tainter's method of probits (Proceedings of the Society for Experimental Biology and Medicine, 1944, Vol. 57, page 261).

II ANALGESIC ACTION (COLUMN B)

The analgesic action was studied by the effect on visceral pain, using the test of Koster and Anderson (Federation Proceedings, 1959, Volume 18, page 412).

Peritoneal irritation is produced by the injection of dilute acetic acid into batches of 5 fasting mice chosen by drawing lots. The animal reacts to the pain by abdominal stretching movements with extension of the hind paws. The analgesic effect of the substances under investigation, which are administered orally 30 minutes before the acetic acid, manifests itself by a reduction in the number of abdominal stretching movements counted during two periods of 5 minutes.

For each product, a range of doses is administered and the 50% effective dose is calculated by the method of probits for the most active products (dose which reduces by half the number of stretching movements relative to those of the control animals).

III ANTIINFLAMMATORY ACTION

The antiinflammatory power of these products was studied by methods respectively numbered 1A, 1B, 2A, 2B.

1. Effect on the Proliferation of Granulation Tissue

A. Experimental Granuloma in the Normal Rat Treated Orally (Column C)

The cotton pellet test of Herschberger and Calhoun is used (Endocrinology 1957, volume 60, page 153) in the male rat having an average weight of 200 g.

Four cotton pellets are introduced subcutaneously into each animal (2 dorsally and 2 ventrally). The rats are then divided into batches of 10 by drawing lots. The treatment is started on the day of implantation and carried out orally. It is continued for 5 consecutive days. The rats are sacrificed on the day after the final treatment; the granulomata are removed, dried for 48 hours and then weighed.

The weights of the granulomata of the treated animals and those of the control animals are then compared by calculating Student's coefficient "$t$" (Statistical Tables for biological, agricultural and medical Research, Editor: S. R. Fischer, Oliver and Boyd, 1957). The results are expressed as a percentage of the variation in the weights of the granulomata of treated rats compared with those of the granulomata of control rats.

B. Experimental Granuloma in the Normal Rat Treated Locally (Column E)

To study the possible local anti-inflammatory action of some of these products, the test described above is carried out on the normal rat but the cotton pellets are introduced together with the product under investigation. For impregnation, the product is dissolved in an organic solvent, the pellet is left to imbibe 0.04 ml of a solution containing 1 mg of the product, and the solvent is evaporated. Each rat receives two pellets impregnated with product and two pellets impregnated with solvent alone.

The animals are sacrificed 6 days later. The granulomata impregnated with the product and the control granulomata are removed, weighed and dried. Statistical analysis of the results is then carried out by calculating the "$t$" of Student.

All the products were tested at a dose of 1 mg per pellet and the results were expressed as before, that is to say, as a percentage variation in the weight of the impregnated granulomata relative to those of the control granulomata.

2. Effect on Oedematous Phenomena.

A. Oedema of the Hind Paw of the Rat Produced by Carragenin (Column D)

The technique of Winter and coworkers is used (Proceedings of the Society for Experimental Biology and Medicine, 1962, Volume 111, page 544), which consists in injecting 0.05 ml of a 1% suspension of carragenin into the plantar region of the right hind paw of the rat. The volume of the paw is measured with a plethysmograph.

The products are administered orally for 5 consecutive days, and oedema of the paw is produced on the fifth day, one hour after the last administration. The volume of the paw is measured before the injection of carrageenin, again three hours later, and finally 24 hours after the administration.

The difference in volume of the paw before and after the carrageenin is determined in the control batch and the treated batch. The percentage variation of the volume of the paws of the treated animals relative to that of the control animals is calculated. The percentage is negative if the volume is smaller and positive if it is larger.

B. Carrageenin Abcess after 24 hours (Column F)

The local inflammatory oedema produced by subcutaneous injection of 0.5 ml of a 2% suspension of carrageenin is measured in the male rat. The abscess formed in this way contains a considerable amount of exudate at the end of 24 hours. It is sufficiently localised to be removed and immediately weighed.

The products are administered orally on two occasions: Immediately after the injection of carrageenin and 6 hours later. The batches of rats (male, 140 ±10 g) are sacrificed 24 hours after the injection and the abscesses are weighed.

The results are expressed as percentages of variation of the weights of the abscesses of the treated rats relative to the weights of the abscesses of a batch of control rats. The coefficient of Student is also calculated.

The results of the various pharmacodynamic tests are summarised in Table I.

TABLE I

| Product No. | A Acute toxicity in the mouse Median lethal dose (mg/kg) IP route | A oral route | B Analgesic action 50% effective dose (mg/kg) | C Dose administered (oral route) mg/kg/day/5 days | D Antiinflammatory action Percentage variation relative to the controls Granuloma | D Carrageenin oedema on paw 3h | D 24h | E Granuloma treated locally Percentage variation 1 mg/pellet | F Carrageenin abscess Dose (oral route mg/kg) | F Percentage variation relative to controls |
|---|---|---|---|---|---|---|---|---|---|---|
| 844 | >500 | >1000 | >100 | 125 | −8* | −48,6* | +1,3 | +6,9 | 250 | −24,6* |
| 844 Na* | 250 to 500 | >1000 | 25 to 50 | 125 | −9,8* | −40,4* | −22,7* | −1 | 250 | −17,7* |
| 844 Ca | 250 | 1000 | 50 to 100 | 125 | −9,2 | −30,7* | −7,0 | +6,2 | 250 | −24,5* |
| 845 | >500 | >1000 | 100 | 125 | −11,7* | −46,2* | −3,5 | −4,8 | 250 | −29,6* |
| 802 | >500 | >500 | 75 | 250 | −16* | −0,9 | −20,3* | −4,5 | 250 | −41,4* |
| 802 Na | about 250 | >1000 | 25 to 50 | 125 | −11,4* | −29,3* | −20,2* | +16,6 | 50 | −21,4* |
| 841 | >500 | >1000 | >50 | 125 | −15,9* | −52,8* | −27,2* | −2,6 | 250 | −21,7* |
| 804 | >500 | >1000 | between 6,25 and 12,5 | 50 | −24* | −49,7* | −44,7* | −5,5 | 50 | −9,7 |
| 804 Na | 125 to 250 | >1000 | 12,5 | 50 | −4 | −47,2* | −39,9* | −14,2 | 50 | −33,9* |
| 804 Ca | >250 | >750 | about 6,25 | 50 | −36,2* | −45,8* | −36,6* |  | 250 | −48,7* |
| 832 | >500 | >1000 | 100 | 25 | −8,9 | −35,8* | −21* |  | 50 | −31,5* |
| 842 | >500 | >1000 | >50 | 125 | −8,6* | −35* | −8,5 | +16,4 | 250 | −16,7* |
| 826 | >250 | about 750 | 25 | 25 | −12,7* | −26,4* | −25,7* | −3,5 | 50 | −24* |
| 788 | about 250 | >1000 | 200 | 250 | −9,6* | −48,9* | −30,9* | +19,7 | 250 | −38* |
| 808 | between 250 & 500 | >1000 | >100 | 250 | −13,8* | −32,8* | −16,8 | +5,6 | 250 | −9,8 |
| 792 | 500 | >1000 | >100 | 250 | −21* | −57,4* | −8,8 | +3,2 | 250 | −2,9 |
| 791 | between 250 & 500 | 750 | 12,5 | 25 | −14* | −43,2* | −22,9* | +2 | 50 | −16,5 |
| 791 Na |  | 750 | >25 | 50 | −33,5* | −58,5* | −5,3 | +3 | 50 | −35,2* |
| 791 Ca |  | 500 | 25 | 50 | −18,5* | −22,7* | −12,9 |  | 50 | −22,3* |
| 846 | >500 | >1000 | >50 | 25 | −18,7* | −47,5* | −15 | +8,9 | 50 | −27,9* |

TABLE I—Continued

| Product No. | A Acute toxicity in the mouse Median lethal dose (mg/kg) IP route | A oral route | B Analgesic action 50% effective dose (mg/kg) | C Dose administered (oral route) mg/kg) day/5 days | D Antiinflammatory action Percentage variation relative to the controls Granuloma | D Carrageenin oedema on paw 3h | D 24h | E Granuloma treated locally Percentage variation 1 mg/ pellet | F Carrageenih abscess Dose (oral route mg/kg) | F Percentage variation relative to controls |
|---|---|---|---|---|---|---|---|---|---|---|
| 801 | >500 | >1000 | 100 | 50 | −13,6* | −39,2* | −25,2* | −10,2 | 50 | −20,8* |
| 814 | between 250 & 500 | >1000 | 100 | 10 | +5 | −23 | +45 | | 50 | −7* |
| 813 | >500 | >1000 | 25 | 10 | −7,6 | −19,8 | +18,4 | | 50 | −15,6* |
| 807 | >125 | >1000 | 50 | 10 | +4 | −7,8 | −8,2 | | 50 | −26* |
| 849 | >500 | >1000 | >50 | 125 | +6,4 | −7,4 | −0,8 | | 250 | −24,5* |
| 851 | >500 | >1000 | 50 | 125 | +9 | −19,5* | −4,8 | | 250 | +1,4 |
| 850 | >500 | >1000 | 25 | 50 | −10,7* | −20,8* | +0,7 | +16 | 100 | −13,5 |
| 848 | >500 | >1000 | >50 | 125 | +3,8 | −42,5* | −11,3 | | 250 | −28* |
| 857 | >500 | >1000 | >50 | 125 | −0,8 | −26,4 | −17,1 | | 250 | +0,2 |
| 856 | about 125 | >1000 | >50 | 125 | −4,7 | −11,9 | −20,1 | | 250 | −19,1* |
| 853 | >500 | >1000 | >100 | 125 | +12 | −26,1 | −8,1 | | 250 | −10,5 |
| 852 | between 250 | about 100 | >100 | 125 | +5,8 | −33,8* | −10,0 | | 250 | −9,8 |
| 854 | >500 | >1000 | >100 | 125 | −5,8 | −39,3* | −23,9* | | 250 | −0,3 |

The sign * indicates that the values obtained with the treated animals differ from those observed on control animals by a threshold value of at least 5%.

IV ACTION ON THE CENTRAL NERVOUS SYSTEM

The compounds of the invention were studied for their action on the central nervous system by means of tests designed to show one of the following: General sedative, myorelaxant, ataractic, anticonvulsant and anxiety relieving effects.

In the series of tests briefly described hereinafter, each of the compounds was tested with at least three graded doses and on batches of 10 or 20 animals for each dose.

The results are summarised in Table II.

DESCRIPTION OF THE TESTS

1. Spontaneous Mobility in Mice (Column G)

The influence of drugs on the voluntary movements of animals can be studied statistically by placing the animals in cages designed for automatic registration. The series of values obtained with the batches of treated animals can then be compared with those obtained with controls the mobility of which is measured the same period of time.

The sedative medicaments substantially reduce spontaneous mobility and thus act on the psycho-motor mechanism.

2. Traction Test on Mice (Column H)

The test consists in observing whether the treated animals are capable of heaving themselves upon a rod which is seized by the front paws only. Inability to do this is interpreted as a myorelaxant action.

3. Equilibration Test (Rotating Rod) in Mice (Column J)

It is determined whether the treated animals are capable of balancing themselves on a horizontal rod 20 mm in diameter which is rotating at the rate of 12 rotations per minute.

Numerous compounds which have ataractic properties disturb this equilibration reflex.

4. Anticonvulsant Action in Mice

This was studied on the convulsive attacks produced by pentetrazole and on the attack induced by an electric current (electric shock).

a. Pentetrazole Attack (Column K)

Pentetrazole injected intraperitoneally in a dose of 125 mg/kg causes fatal convulsions in all the animals. Certain compounds protect against the convulsions and enable the animals to survive.

b. Electric Shock (Column L)

Mice are treated on the eve of the day of the test. The intensity of current required for inducing supramaximal electric shock (non-fatal) was determined for each mouse. The current used has the following characteristics:

50 cycle alternating current,
current applied by means of two spherical electrodes placed on the eyeballs,
duration of current 0.2 second,
Intensity between 30 and 50 mA.

5. Exploration Test In Mice (Column M)

This very simple test enables one to express numerically the behaviour of an animal in a free situation placed in an environment previously unknown to it.

The mouse is placed at the centre of a board perforated by six equidistant apertures 30 mm in diameter. The number of apertures explored in the course of 5 minutes, by the end of which time the animal has partly lost interest, can be marked on an impulse counter by means of a device providing a beam of light and photo-electric cells. The test demonstrates an instinct for restless curiosity. Anxiety relieving medicaments considerably reduce exploration at doses which do not affect spontaneous mobility. (See Table II on following page)

ified in the majority of the patients (more than 92 %). The amount of white glubules is not modified.

No modification on the blood plaques or on the prothrombin rate.

5. Renal Tolerance

Excellent — Azotemia is unmodified.

TABLE II

| | Activity obtained with different tests (expressed in the form of the 50% effective dose[1] in mg/kg | | | | | |
|---|---|---|---|---|---|---|
| | G | H | J | K | L | M |
| | | | | Convulsions induced by | | |
| Compounds administered and route of administration[2] | Spontaneous mobility (inhibition) | Traction (inhibition) | Equilibration (inhibition) | Pentetrazole (protection) | Electric shock (protection) | Exploration (inhibition) |
| 844 (acid form) I.P. | 25 | >100 | 25 | >100 | >100 | 75 |
| do. (sodium salt) I.P. | 25 | >100 | 100 | >100 | >100 | >100 |
| do. (calcium salt) I.P. | 25 | >100 | 25 | >100 | >100 | >100 |
| 845 — I.P. | 100 | >100 | 100 | | >100 | >100 |
| 802 (acid form) I.P. | 15 | >100 | 15 | >100 | >100 | 50 |
| do. (sodium salt) I.P. | 15 | >100 | 25 | >100 | >100 | >100 |
| 841 — I.P. | 25 | >100 | >100 | >100 | >100 | >100 |
| 804 (acid) I.P. | 30 | >100 | 15 | >100 | >100 | >60 |
| do. (sodium salt) I.P. | 15 | | | | >100 | >50 |
| do. (calcium salt) I.P. | 15 | | | | >100 | >50 |
| 832 — I.P. | 25 | >100 | >100 | >100 | >100 | >100 |
| 842 — I.P. | 25 | >100 | 25 | >100 | >100 | 25 |
| 826 — I.P. | 25 | >100 | >100 | >100 | >100 | >100 |
| 788 — I.P. | 50 | >100 | 25 | >100 | >100 | >100 |
| 808 — I.P. | 15 | >60 | 15 | >100 | >100 | >100 |
| 792 — I.P. | 15 | >100 | 15 | >100 | >100 | 50 |
| 791 (acid) I.P. | 25 | >100 | >100 | >100 | >100 | >100 |
| do. (sodium salt) I.P. | >100 | | | | >100 | >100 |
| do. (calcium salt) I.P. | 25 | | | | >100 | >100 |
| 846 — I.P. | >100 | >100 | >100 | >100 | >100 | >100 |
| 801 — I.P. | 30 | >100 | 30 | >100 | >100 | >100 |
| 814 — I.P. | 25 | >100 | 75 | >100 | >100 | 100 |
| 813 — I.P. | 25 | >100 | 25 | >100 | >100 | 50 |
| 807 — I.P. | 30 | >100 | >100 | >100 | >100 | 100 |
| 849 — I.P. | >25 | >100 | 100 | >100 | >100 | 100 |
| 851 — I.P. | 25 | >100 | 100 | >100 | >100 | 12,5 |
| 850 — I.P. | >25 | >100 | >100 | >100 | >100 | >100 |
| 848 — I.P. | >25 | >100 | >25 | >100 | >100 | >100 |
| 857 — I.P. | 50 | >100 | >100 | >100 | >100 | >100 |
| 856 — I.P. | >25 | >100 | 50 | >100 | >100 | 100 |
| 853 — I.P. | >25 | 100 | >25 | >100 | >100 | 25 |
| 852 — I.P. | >25 | >100 | 100 | >100 | >100 | 100 |
| 854 — I.P. | >100 | >100 | >100 | >100 | >100 | >100 |

(2) I.P. = intraperitoneal (1) The 50% effective dose is to be understood to mean that dose which, in the test under consideration, causes an inhibition of 50% relative to the controls or protection of 50% of the animals treated.

Bearing in mind the pharmacological results recorded above, the compounds of the present invention may be used in particular for analgesic and/or antiinflammatory purposes in human and veterinary medicine.

Compound 804 CB and its sodium and calcium salts are particularly active. They may be used for the treatment of inflammatory rheumatisms, arthrosis of the big articulations, gout and superficial phlebitis.

The tolerance of the calcium salt of compound 804 CB (804 Ca) has been tested.

The results are the following:

1. Digestive Tolerance

When digestive troubles appeared by the treated patients, it was sufficient to associate compound 804 Ca with drugs protecting digestive mucous membranes.

2. Blood-pressure (Arterial Tension)

No anomaly by patients treated with 804 Ca.

3. Ocular Surveillance

No anomaly.

4. Hematologic Tolerance

The amount of red blood corpuscles remains unmod-

6. Hepatic Tolerance

Cholesterolemia and bilirubinemia and alkaline phosphatases presented no variations.

Transaminases GOT and GPT remain unmodified.

The invention comrises medicaments containing compounds defined above in particular in suitable forms for administration by oral, endorectal and parenteral routes. These may be gelatine capsules or tablets containing 10 to 500 mg, preferably 200 to 400 mg of active principle per unit.

The daily dose is by the adult from 20 mg to 3g of active ingredient, preferably from 800 to 1600 mg and more particularly 1200 mg.

The daily dose of active ingredient by the infant may be preferably from 5 to 30 mg/kg of bodyweight.

An example of a formula for tablet is the following:

| | | |
|---|---|---|
| 804 Ca (calcium salt of 804CB) | 400 | mg |
| Microcristalline cellulose | 90,1 | mg |
| Magnesium stearate | 4 | mg |
| Vinylpyrrolidone and vinylacetat polymerisat | 0,1 | mg |
| for a tablet of | 560 | mg |

The tablet may then be coated.

The tablets may be prepared by the usual method of double compression or granulation, using an aqueous gum solution or a non-aqueous solvent such as ethyl alcohol. Examples of suitable excipients are: Starch, talcum, gum arabic, magnesium stearate and carboxymethyl cellulose.

The tablets may be rendered enteric by glutinisation or by coating them with a substance which is resistant to the action of gastric juice such as cellulose acetophthalate in order to prevent the action of gastric hydrochloric acid on the active principle or to prevent any gastric trouble. The tablets may be sugar coated or not, opaque and, if desired, coloured.

What we claim is:

1. An anti-inflammatory composition suitable for the treatment of inflammatory rheumatism in oral dosage form comprising
    an anti-inflammatorily effective amount of the calcium salt of the free acid

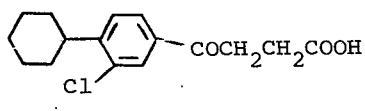

and a compatible pharmaceutical carrier.

2. The anti-inflammatory composition of claim 1 in tablet form, each tablet containing from 200 to 400 mg of said calcium salt.

3. A method of treating inflammation and inducing analgesia which comprises
    administering to a subject an effective amount of the compound having the formula

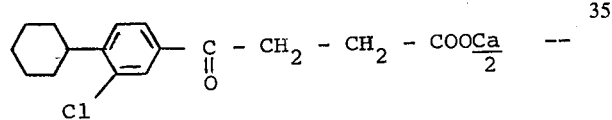

4. Method according to claim 3 which comprises administering to an adult subject from 800 to 1,600 mg of the compound having the formula

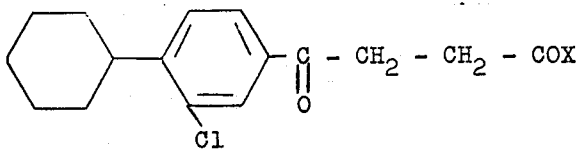

5. Method according to claim 3 which comprises administering to an infant from 5 to 30 mg/kg of bodyweight of the compound of the formula

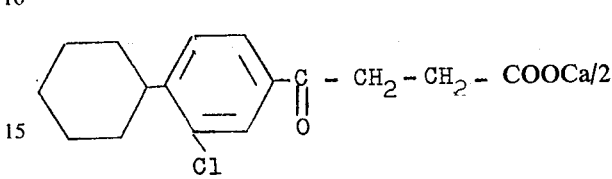

6. A method of treating inflammatory rheumatism which comrises
    administering to a subject an effective amount of the compound having the formula

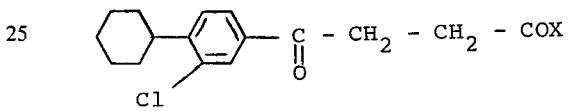

where X is OH, ONa or O (Ca/2).

7. The method according to claim 6 which comprises administering to a subject an effective amount of the compound having the formula

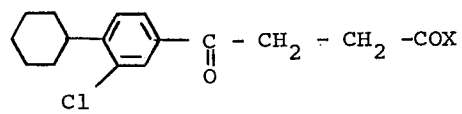

where X is O (Ca/2).

* * * * *